US006963346B2

(12) United States Patent
Lewis

(10) Patent No.: US 6,963,346 B2
(45) Date of Patent: Nov. 8, 2005

(54) METHOD AND SYSTEM FOR EFFICIENTLY USING FEWER BLENDING UNITS FOR ANTIALIASING

(75) Inventor: Michael C. Lewis, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/829,013

(22) Filed: Apr. 21, 2004

(65) Prior Publication Data

US 2004/0196296 A1 Oct. 7, 2004

Related U.S. Application Data

(63) Continuation of application No. 10/051,738, filed on Jan. 17, 2002, now Pat. No. 6,747,664, which is a continuation of application No. 09/589,676, filed on Jun. 7, 2000, now Pat. No. 6,369,828, which is a continuation of application No. 09/307,317, filed on May 7, 1999, now abandoned.

(51) Int. Cl.[7] ............................................... G09G 5/00
(52) U.S. Cl. ...................................................... 345/611
(58) Field of Search ......................................... 345/611

(56) References Cited

U.S. PATENT DOCUMENTS

| 4,918,626 | A |   | 4/1990  | Watkins et al. |         |
|-----------|---|---|---------|----------------|---------|
| 5,471,567 | A |   | 11/1995 | Soderberg et al. |       |
| 5,684,939 | A | * | 11/1997 | Foran et al. ............ | 345/612 |
| 5,872,902 | A |   | 2/1999  | Kuchkuda et al. |        |
| 5,886,701 | A |   | 3/1999  | Chauvin et al. |         |
| 5,926,181 | A | * | 7/1999  | Lewis et al. ............ | 345/421 |
| 5,943,060 | A |   | 8/1999  | Cosman et al. |          |
| 5,963,210 | A | * | 10/1999 | Lewis et al. ............ | 345/419 |
| 6,128,000 | A | * | 10/2000 | Jouppi et al. ............ | 345/614 |
| 6,201,545 | B1 | * | 3/2001  | Wong et al. ............ | 345/428 |
| 6,369,828 | B1 | * | 4/2002  | Lewis ..................... | 345/611 |
| 6,445,392 | B1 |   | 9/2002  | Morein et al. |          |
| 6,489,956 | B1 |   | 12/2002 | Deering |               |
| 6,747,664 | B2 | * | 6/2004  | Lewis ..................... | 345/611 |

OTHER PUBLICATIONS

Kurt Akeley, 1993, ACM–0–89791–601–8/93/008, "RealityEngine Graphics".*

Ned Greene, 1996, ACM–0–89791–746–4/96/008, "Hierarchical Polygon Tiling with Coverage Masks".*

Kurt Akeley, 1993, ACM–0–89791–601–8/93/008, "Reality Engine Graphics".

* cited by examiner

Primary Examiner—Matthew C. Bella
Assistant Examiner—Jin-Cheng Wang
(74) Attorney, Agent, or Firm—Sawyer Law Group LLP

(57) ABSTRACT

A system and method for providing antialiasing of a graphical image on a display is disclosed. The graphical image is generated from data describing at least one object. The display includes a plurality of pixels. The at least one object includes a plurality of fragments. A portion of the plurality of fragments intersects a pixel of the plurality of pixels. Each of the plurality of fragments including an indication of a portion of a corresponding pixel that is intersected. The system and method include providing at least one active region for the pixel. The at least one active region intersects a first portion of the pixel. The method and system also include providing at least one new region. A first portion of the at least one new region indicates where in the pixel the at least one active region and the fragment intersect. A second portion of the at least one new region indicates where in the pixel the at least one active region and the fragment do not intersect. The method and system further include blending a portion of the fragment in a second portion of the pixel corresponding to the first portion of the at least one new region.

1 Claim, 14 Drawing Sheets

320

| 1 | 1 | 1 | 1 |
|---|---|---|---|
| 1 | 1 | 1 | 1 |
| 1 | 1 | 1 | 1 |
| 1 | 1 | 1 | 1 |

METHOD AND SYSTEM FOR EFFICIENTLY USING FEWER BLENDING UNITS FOR ANTIALIASING

CROSS-REFERENCE TO RELATED APPLICATIONS

The present application is a continuation of prior application Ser. No. 10/051,738 filed on Jan. 17, 2002 now U.S. Pat. No. 6,741664, which is a continuation of prior application Ser. No. 09/589,676 filed Jun. 7, 2000, now U.S. Pat. No. 6,369,828 which is a continuation of prior application Ser. No. 09/307,317 filed on May 7, 1999 now abandoned.

FIELD OF THE INVENTION

The present invention relates to displaying graphical image on a computer system and more particularly to a method and system for performing antialiasing using a single blending unit, which reduces the size of the system, without requiring additional time in most cases.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons. A conventional system then renders the polygons in a particular order. For a three-dimensional scene, the opaque polygons are generally rendered from front to back as measured from the viewing plane of the display. Translucent polygons are desired to be rendered from back to front. Similarly, a two-dimensional scene can be displayed. For a two-dimensional scene, polygons are rendered based on a layer order, rather than on a depth value. Shallower layers occlude deeper layers.

Each of the polygons includes edges. When rendering an image, the conventional system often renders diagonal lines or polygon edges that are not perfectly horizontal or vertical. Because each pixel has finite physical dimensions, edges which are not horizontal or vertical may appear jagged. For example, consider each pixel to be a square. A diagonal line or edge rendered using the square pixels will appear jagged, similar to a staircase. This effect is known as aliasing.

In order to reduce aliasing, conventional systems perform antialiasing. Antialiasing helps reduce the effect that the physical dimension of the pixels has on the appearance of objects being displayed. Diagonal lines and edges appear smoother.

Several conventional mechanisms are used to perform antialiasing. Many of the conventional techniques also evaluate and blend data on the subpixel level. Each mechanism also has its drawbacks. For example, one conventional mechanism for antialiasing is conventional supersampling. Conventional supersampling is performed for a portion of the display, called a tile, or the entire display at a time. Each pixel in the tile or display is considered to be an M×N matrix subpixels. Data for each polygon in the tile is evaluated at each subpixel. Thus, the depth value, color, texture, and other data for the polygon can differ in and is evaluated at each subpixel. Data for the subpixels in each pixel in the tile are combined to provide the data for each pixel in the tile. Because supersampling evaluates and combines depth values for subpixels, supersampling can help smooth out the staircasing effect on implicit edges. However, the system requires sufficient memory to retain data for the M×N subpixels in each pixel in a tile to perform supersampling. Therefore, a large amount of memory is required. This increases the size of the system. It must also be ensured that there are no artifacts at the seams between tiles. This slows processing. Furthermore, much more data is processed for each pixel in the display, regardless of any uniformity of the subpixels within a pixel. Supersampling is thus computation intensive and relatively slow.

Some conventional systems address some of the problems in supersampling by performing adaptive supersampling. Adaptive supersampling first identifies areas where supersampling may be desired, such as near edges. Once this area is identified, supersampling is performed for a tile in including this area. In other areas, supersampling is not performed. For example, a conventional system could mark the edges of each polygon, indicating that the edges are the exterior of the polygon and thus form the silhouette of the polygon. This silhouette is antialiased. Although adaptive supersampling improves processing speed by reducing the areas subjected to supersampling, a large amount of memory is still required. Furthermore, the identification of areas to be supersampled can be computation intensive. For example, the determination of the silhouette of a polygon, discussed above, requires a relatively expensive computation. Thus, the system may still be relatively large or slow.

Another conventional mechanism for antialiasing uses an accumulation buffer ("A-buffer") and is known as an A-buffer technique. Data for each pixel in each polygon is processed. During processing, a mask is provided for each pixel in each polygon. The mask indicates the portion of the pixel covered by the polygon. The mask can thus be viewed as indicating the subpixels each polygon covers. A linked list of the polygon masks is then provided for each pixel. The linked list typically holds a mask, a color value, and other data relating to each polygon's potential contribution to the display of the pixel. After the entire scene has been stored in the A-buffer, the linked list is then traversed in order to accumulate and render data from the polygons associated with each pixel. Aliasing is thereby reduced. However, two passes are made through the data in order to render objects to the display. The first pass is to provide the masks for each polygon and to associate the polygons with particular pixels. The second pass utilizes the data stored for each pixel to determine how data for each pixel is to be displayed. Thus, this mechanism is time consuming. The linked list must also be managed by the computer graphics system, making the A-buffer technique more difficult to implement. Typically both an A-buffer and a frame buffer are used in rendering the scene. Therefore, the A-buffer technique also requires additional memory.

Yet another conventional method for antialiasing could use a weighting factor. The weighting factor indicates the percentage of a pixel which a polygon occupies. For example, if a polygon occupies an entire pixel, the weighting factor may be one. The weighting factor for pixels at the edges of the polygon may thus be less than one. This weighting factor would then be taken into account when the data for different polygons intersecting a pixel are blended.

The above conventional antialiasing techniques have an additional drawback. In order to maintain processing speed, the above conventional methods may use multiple blending units or a more complex blending unit. A blending unit performs the mathematical operation that blends a stored value, such as color for a subpixel, with a color for a fragment. In the conventional antialiasing method that uses weighting, the blending unit may be more complex in order to account for the weight. Similarly, supersampling, adaptive supersampling, and the A-buffer technique may use multiple blending units to maintain processing speed. This is because supersampling, adaptive supersampling, and the A-buffer technique evaluate and combine data at the subpixel level. Blends are thus performed for each subpixel in a pixel to ensure that each subpixel contributes the correct color and other information to the pixel. In order to maintain processing speed when subpixels are used, the blends for each subpixel are typically performed in parallel. A blending unit for each subpixel is used to perform these blends in parallel.

Although a blending unit can be used for each subpixel, as the number of subpixels used increases, the number of blending units increases dramatically. For example, for a 2×2 array of subpixels, four blending units are required to perform all operations in parallel. For a 4×4 array of subpixels, sixteen blending units are required to perform all operations in parallel. Providing such a large number of blending units consumes a great deal of space and is quite costly, both of which are undesirable.

Accordingly, what is needed is a system and method for reducing the number of blending units used. It would also be desirable if the system and method did not sacrifice performance. The present invention addresses such a need.

SUMMARY OF THE INVENTION

The present invention provides a method and system antialiasing of a graphical image on a display. The graphical image is generated from data describing at least one object. The display includes a plurality of pixels. The at least one object includes a plurality of fragments. A portion of the plurality of fragments intersects a pixel of the plurality of pixels. Each of the plurality of fragments includes an indication of a portion of a corresponding pixel that is intersected. The system and method comprise providing at least one active region for the pixel. The at least one active region intersects a first portion of the pixel. The method and system also comprise providing at least one new region. A first portion of the at least one new region indicates where in the pixel the at least one active region and the fragment intersect. A second portion of the at least one new region indicates where in the pixel the at least one active region and the fragment do not intersect. The method and system further comprise blending a portion of the fragment in a second portion of the pixel corresponding to the first portion of the at least one new region.

According to the system and method disclosed herein, the present invention provide antialiasing using fewer blending units, thereby decreasing overall system size, generally without adversely impacting performance.

BRIEF DESCRIPTION OF THE DRAWINGS

FIG. 9 is a block diagram of a first active region for the pixel.

DETAILED DESCRIPTION OF THE INVENTION

The present invention relates to an improvement in displaying graphical images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
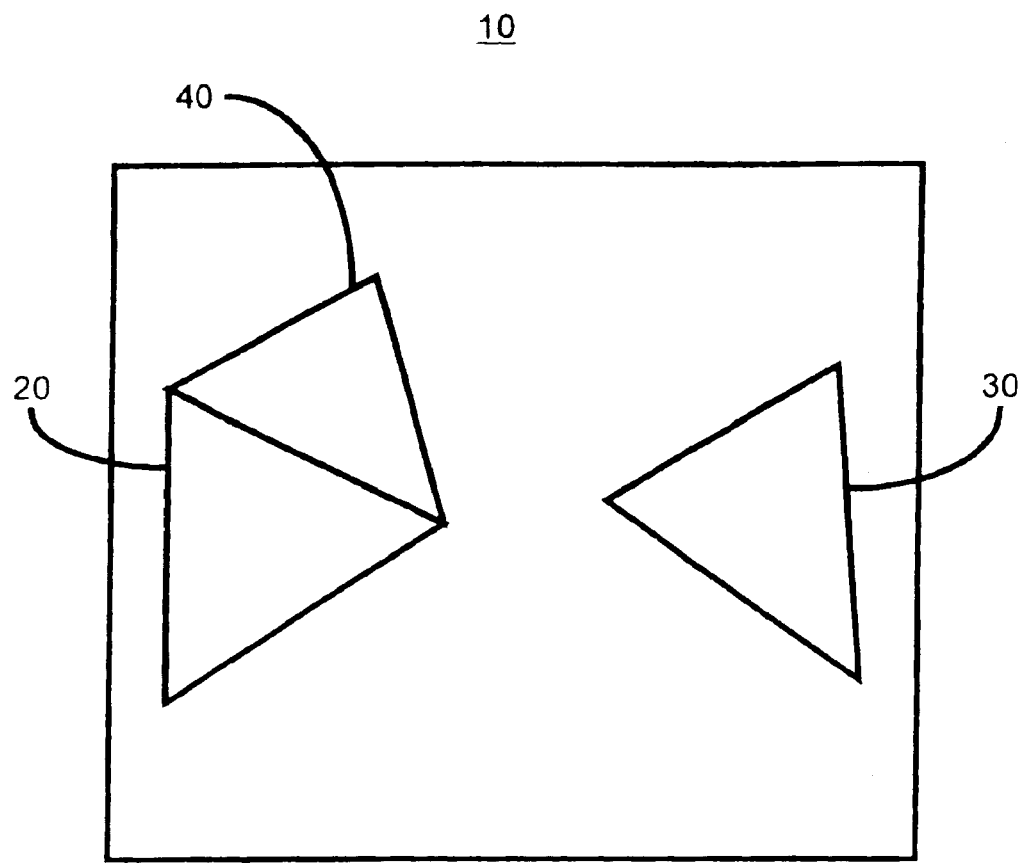
FIG. 1A is a block diagram of a graphical display including a plurality of polygons.

FIG. 1A is a diagram of a graphical image on a display 10 containing three polygons 20, 30, and 40. The polygons 20, 30, and 40 may be part of objects which are part of a graphical image being shown on the display 10. The polygons 20, 30, and 40 could be part of three-dimensional or two-dimensional objects.

Figure 1B:
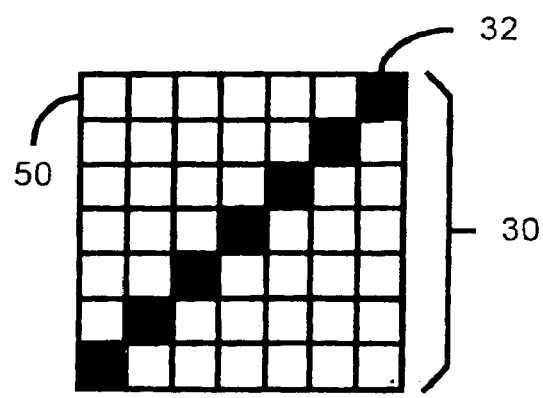
FIG. 1B is a block diagram depicting a closer view of one of the plurality of polygons in the display.

FIG. 1B depicts a closer view of a portion of the polygon 30. An edge 32 of the polygon 30 is depicted. FIG. 1B also depicts pixels 50, only one of which is labeled. The pixels in the display 10 have a finite area and are depicted as squares. Because the pixels in the display 10 have a finite size, the edge 32, as well as the other edges not depicted in FIG. 1B, are jagged.

Figure 2:
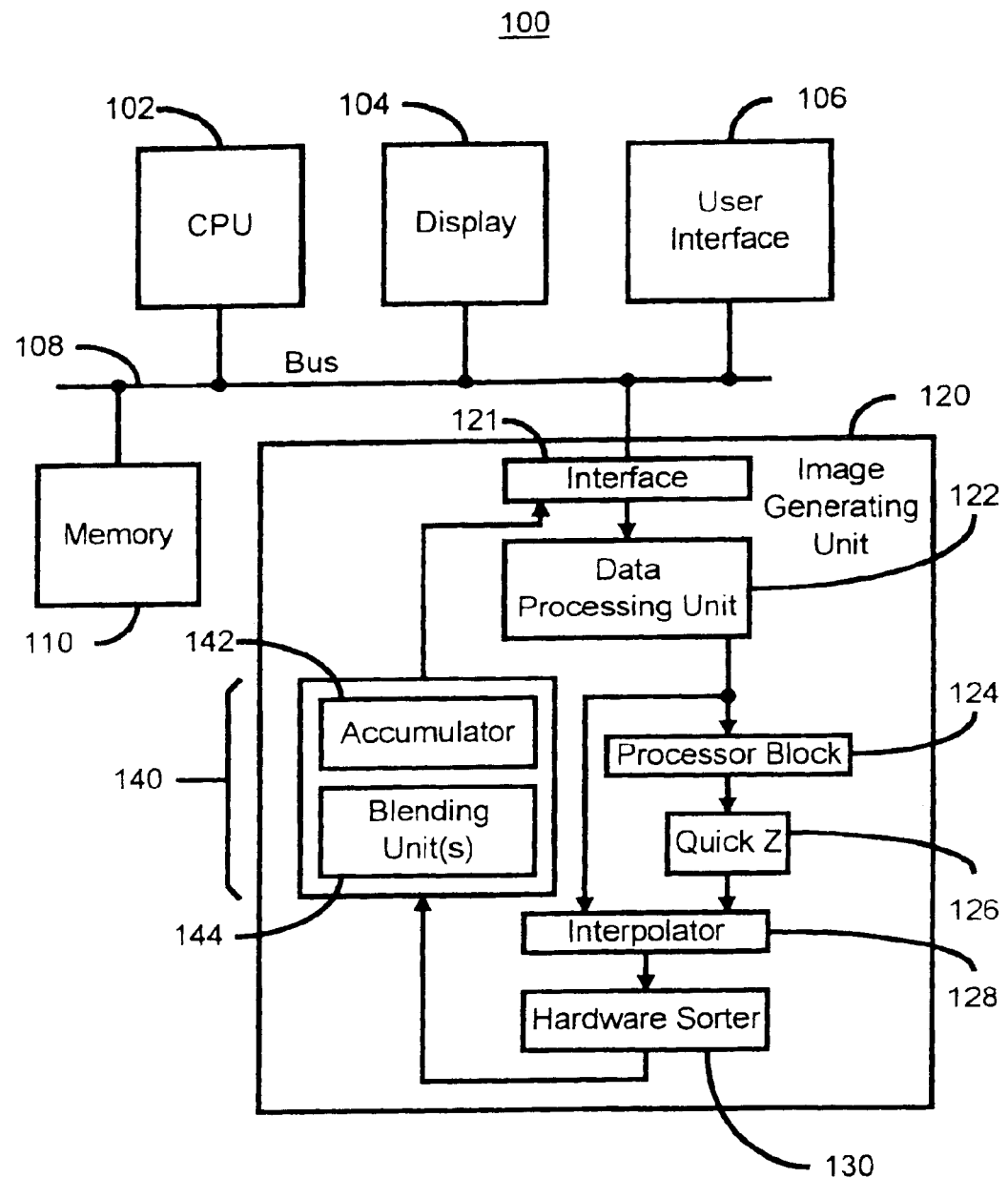
FIG. 2 is a block diagram depicting a computer graphics system.

FIG. 2 depicts a simplified block diagram of one embodiment of a computer graphics system 100. The system 100 is used to display objects, particularly three-dimensional objects. The system 100 is also used in antialiasing described in co-pending U.S. patent application Ser. No. 09/239,413, entitled "METHOD AND SYSTEM FOR PROVIDING EDGE ANTIALIASING" filed on Jan. 28, 1999 and assigned to the assignee of the present application. Applicant hereby incorporates by reference the above-mentioned co-pending application. Portions of the computer system 100 are also described more completely in co-pending U.S. patent application Ser. No. 08/624,261 entitled "Method and Apparatus for Identifying and Eliminating Three-Dimensional Objects Visually Obstructed from a Planar Surface" filed on Mar. 29, 1996. Applicant hereby incorporates by reference the above-mentioned co-pending application. The present invention is also related to co-pending U.S. patent application Ser. No. 08/624,260 entitled "Graphics Processors, System and Method for Generating Screen Pixels in Raster Order Utilizing a Single Interpolator" filed on Mar. 29, 1996. Applicant hereby incorporates by reference the above-mentioned co-pending application.

The computer graphics system 100 includes a central processing unit (CPU) 102, a display 104, a user interface 106 such as a keyboard or mouse or other communicating device, a memory 110, and an image generating unit 120 coupled with a bus 108. The display 104 includes a plurality of pixels, such as the pixels 50 in the display 10. Each of the plurality of pixels has an area. The display 104 could include a display memory (not shown) to which pixels are written. For example, the display 104 could include a frame buffer. In order generate a graphical image, each of the objects in the image may be broken into polygons to be used in rendering the objects. In the above-mentioned co-pending applications, the polygons are preferably rendered in raster order. That is, portions of the polygons are rendered in the order of the pixels in the display 104. However, in the present invention, the polygons may be rendered in another order.

The image generating unit 120 includes an interface 121 connected to the bus 108. The interface 121 transmits data to a data processing unit 122. A processor block 124 coupled with the data processing unit 122 identifies data describing portions of polygons ("intersecting polygons") which intersect the area extending along a z-axis from a selected pixel in an x-y plane corresponding to a screen of the display 104. The processor block 124 may include a separate processor for each intersecting polygon. The data for with the portion of the intersecting polygon associated with the selected pixel is termed a fragment. For example, a fragment includes the color, texture, and depth value for the corresponding polygon. Data relating to each selected pixel includes a fragment for each of the intersecting polygons. In the context of this disclosure, a fragment for an intersecting polygon will be described as intersecting the pixel that the polygon intersects.

An obstructed object identifier/removal unit 126 receives at least a portion of the fragment from each intersecting polygon associated with the selected pixel and removes portions of the fragments for the intersecting polygons which are obstructed. The obstructed object identifier/removal unit 126 may perform this function without determining the precise z-value of the polygon. The interpolator 128 receives the fragments for the intersecting polygons for the selected pixel and interpolates the data, including interpolating texture, color, and alpha values for the fragment. The interpolator 128 also provides a mask for each fragment. However, in an alternate embodiment, mask generation can be provided by another unit. The mask can be considered part of the fragment for an intersecting polygon. The fragments to be rendered are provided by the interpolator 128 to a hardware sorter 130, which sorts the fragments, preferably based on the z value or depth value, for each fragment.

The sorted fragments for the selected pixel are then provided to an antialiasing unit 140. The antialiasing unit 140 described in the above-mentioned co-pending applications includes an accumulator 142, blending unit(s) 144. The accumulator 142 includes subpixel buffers, not shown in FIG. 2. In one embodiment of the system disclosed in the above-mentioned copending application, the accumulator 142 includes a separate subpixel buffer for each subpixel into which a pixel is divided.

In the above-mentioned co-pending application, each fragment includes a mask and a depth value. The mask, hereinafter referred to as an area mask, indicates a portion of the pixel that the fragment intersects. The area mask is used to determine the contribution a fragment makes to the pixel it intersects. The area mask indicates which of the subpixels in a pixel the fragment intersects. Where a particular pixel includes an edge of a polygon, such as the edge 122, the area mask for the fragment indicates that the fragment only intersects some of the subpixels. The fragment is blended only in these subpixels. Each subpixel buffer in the accumulator 142 is used to store information for fragments contained in each of the subpixels within the selected pixel. The blending unit(s) 144 blend the data provided to the subpixel buffers. The antialiased data for the selected pixel is then provided to the display 104.

Implicit edge antialiasing is described in U.S. patent application Ser. No. 09/589,673, entitled "METHOD AND SYSTEM FOR PROVIDING IMPLICIT EDGE ANTI-ALIASING" (1197P) filed on Jun. 7, 2000 and assigned to the assignee of the present application. Applicant hereby incorporates by reference the above-mentioned co-pending application. Implicit edges are those edges which are not explicitly defined, but which are subject to aliasing. The antialiasing described in this co-pending application takes into account differences in depth values at different subpixels is. In this system and method, each fragment includes a depth value, a slope of the depth value, and an area mask. The method and system calculate a subpixel depth value for each fragment using the depth value and the slope of the depth value of the fragment. The method and system determine whether to blend a portion of the fragment based on the plurality of subpixel depth values for the fragment and the area mask of the fragment.

In order to determine whether to blend a portion of the fragment based on the subpixel depth values, two additional masks are calculated. A depth mask is first calculated. The depth mask indicates the subpixels in which a calculated depth value is less than a stored depth value in the accumulator 144. Thus, the depth mask indicates the subpixels in which the fragment would be visible if the fragment exists at that position. The depth mask and the area mask are then intersected to provide a total mask. The total mask should indicate the subpixels in which the fragment is visible. The fragment is then blended in these subpixels.

Although the methods and systems described in the above-mentioned co-pending applications function adequately for their intended purpose, one of ordinary skill in the art will realize that blends are still provided on the subpixel level. Thus, for a 4×4 set of subpixels sixteen blends are performed. In embodiments of the above-mentioned co-pending applications, a blending unit(s) 144 is provided for each subpixel in the accumulator 140. Providing a blending unit 144 for each subpixel allows the blending unit 144 to process a fragment in a single clock cycle. In other words, each new fragment is blended in parallel for each subpixel by one of the blending unit(s) 144. However, each blending, or arithmetic, unit 144 is relatively complex. Providing sixteen blending units 144, one for each subpixels, consumes a large amount of space. As the number of subpixels increases, the number of blending units and, therefore, space consumed increase rapidly. It continues to be desirable to decrease the amount of space and, therefore, silicon, that is consumed by computer graphics system. Even if fewer blending units could be provided, it would still be desirable to use such units efficiently. Accordingly, it would be desirable to decrease the size of the system 100 depicted in FIG. 2, without substantially reducing the speed of the system 100.

The present invention provides a method and system antialiasing of a graphical image on a display. The graphical image is generated from data describing at least one object.

The display includes a plurality of pixels. The at least one object includes a plurality of fragments. A portion of the plurality of fragments intersects a pixel of the plurality of pixels. Each of the plurality of fragments includes an indication of a portion of a corresponding pixel that is intersected. The system and method comprise providing at least one active region for the pixel. Each of the at least one active region intersects a first portion of the pixel. The method and system also comprise providing at least one new region. A first portion of the at least one new region indicates where in the pixel each of the at least one active region and the fragment intersect. A second portion of the at least one new region indicates where in the pixel each of the at least one active region and the fragment do not intersect. The method and system further comprise blending a portion of the fragment in a second portion of the pixel corresponding to the first portion of the at least one new region.

The present invention will be described in terms of a particular system utilizing a single blending unit. However, one of ordinary skill in the art will readily recognize that this method and system will operate effectively for other types of systems and another number of blending units. The present invention will also be described in terms of a particular computer system and processing fragments in a particular order. However, one of ordinary skill in the art will readily recognize that this method and system will operate effectively for other types of computer systems and processing fragments in another order. Furthermore, the present invention will be described in the context of specific blocks performing certain functions and methods performing certain steps in a particular order. However, one of ordinary skill in the art will readily realize that other blocks can provide these functions and that the steps may be performed in another order or in parallel. For example, the present invention may be used in another computer graphics system which provides and blends data at the subpixel level but which does not render polygons in raster order, uses another mechanism or no mechanism to sort and remove obstructed polygons, and does not provide processors 124 to process fragments in parallel. Thus, the present invention is consistent with other architectures and other methods of antialiasing, such as supersampling, adaptive supersampling, or the A-buffer technique. The present invention can be used in any system in which multiple blending units might otherwise be used.

Figure 3:
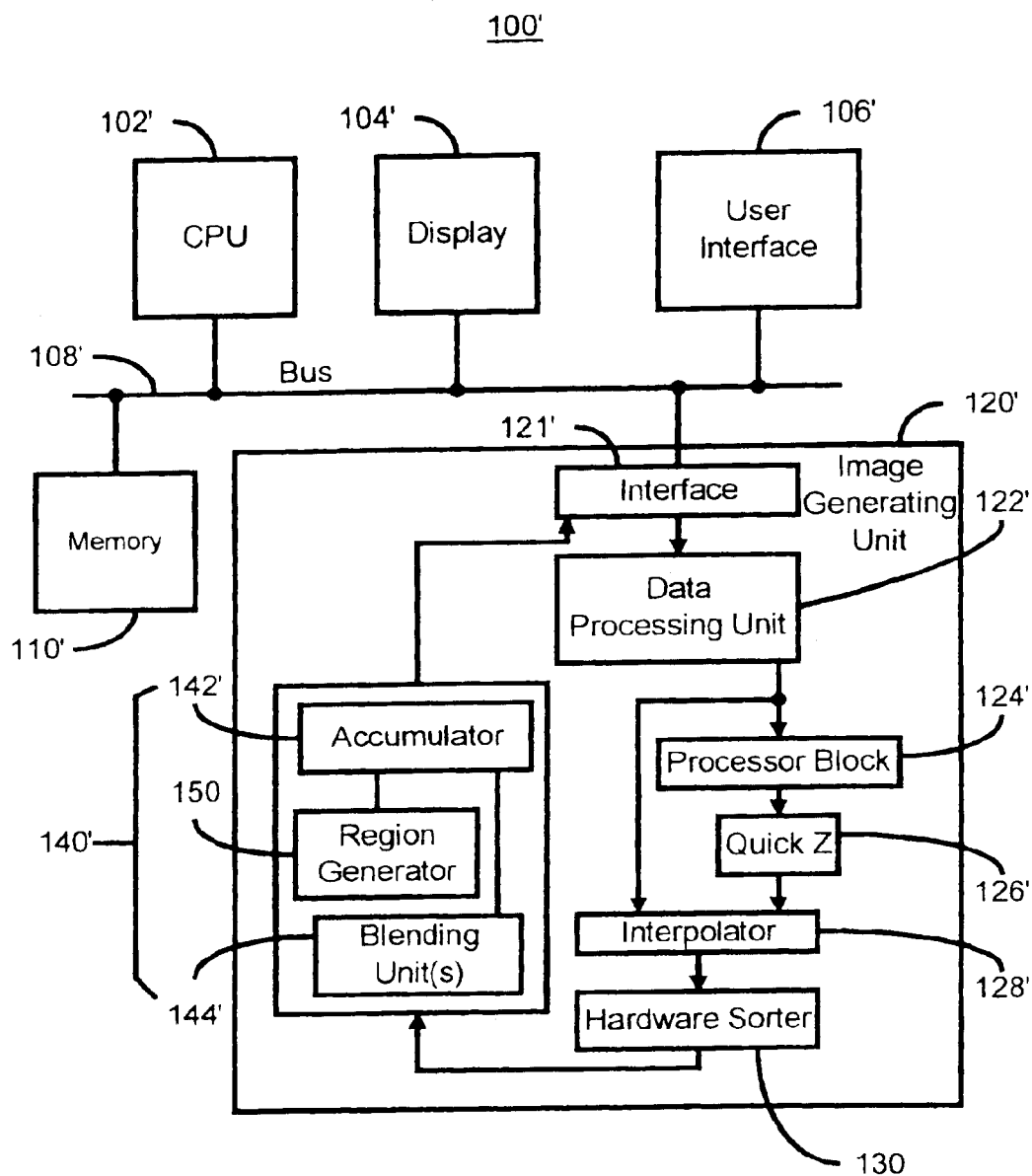
FIG. 3 is a block diagram depicting a computer graphics system in accordance with the present invention.

To more particularly illustrate the method and system in accordance with the present invention, refer now to FIG. 3 depicting a high level block diagram of one embodiment of such a system 100'. Many components of the system 100' are analogous to the components depicted in the system 100 shown in FIG. 2. These components are labeled similarly. For example, the display 104' depicted in FIG. 3 corresponds to the display 104 depicted in FIG. 2. Thus, the display 104' may include a display memory (not shown). Referring back to FIG. 3, the antialiasing unit 140' includes accumulator 142', blending unit(s) 144', and region generator 150. The accumulator 140' still includes a plurality of subpixel buffers (not shown in FIG. 3). The subpixel buffers store data for fragments which intersect a particular pixel of the display 104'. In a preferred embodiment, the number of blending unit(s) 144' is one. In an alternate embodiment, the number of blending units is less than the number of subpixels.

Figure 4:
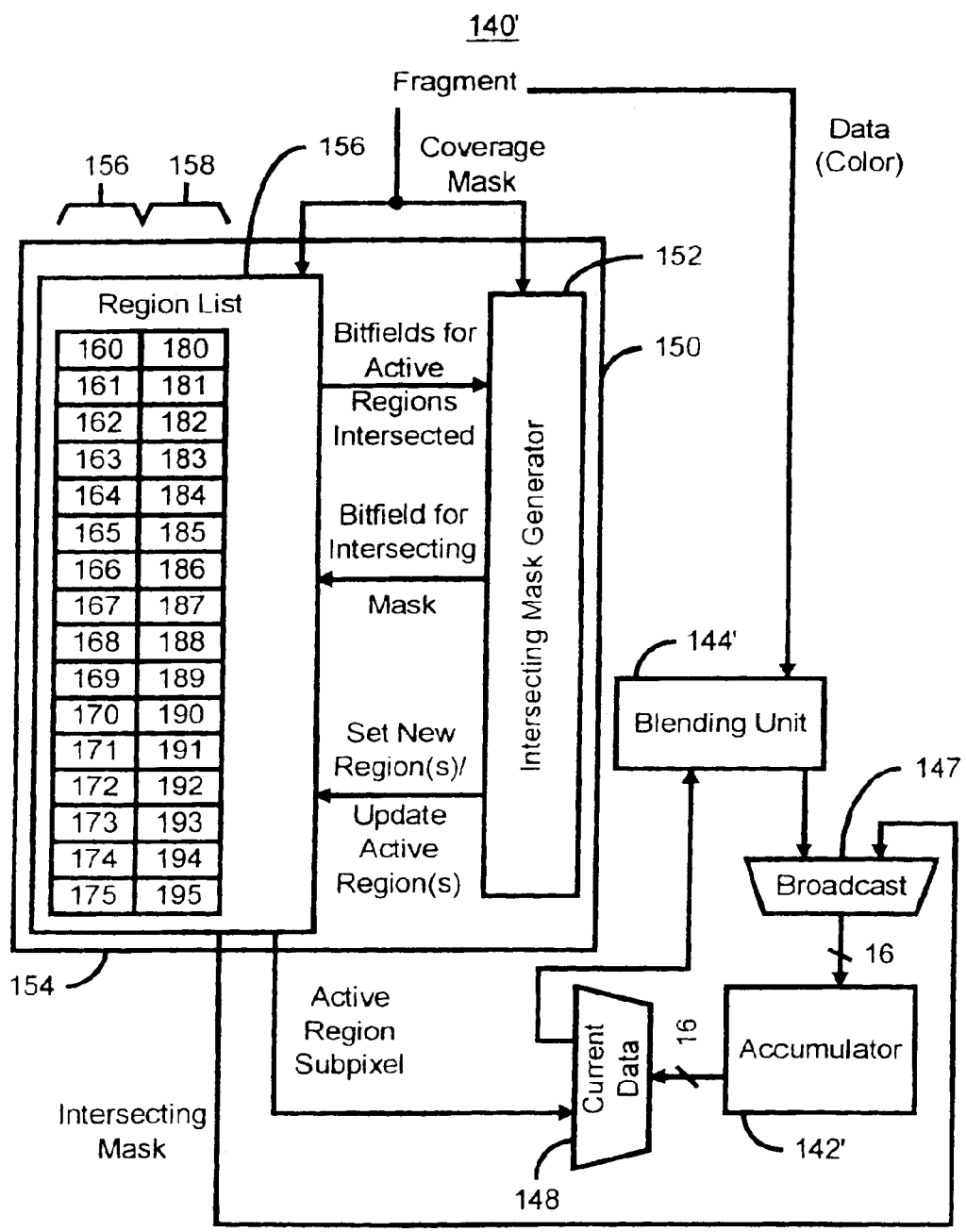
FIG. 4 is a block diagram depicting a preferred embodiment of an antialiasing unit in accordance with the present invention.

FIG. 4 depicts a more detailed block diagram of the antialiasing unit 140' in accordance with the present invention. The antialiasing unit 140' includes the accumulator 142', the blending unit 144', and the region generator 150. Also depicted are broadcast unit 147 and current data unit 148. The region generator 150 includes an intersection mask generator 152 coupled to the region list 154. The region list 154 includes two fields, a region number 156 and a region bitfield 158. The region number 156 includes active entries 160–175 for each possible active region. In a preferred embodiment, the maximum number of possible active regions, the number of active entries 160–175, is the same as the number of subpixels. In each active entry 160–175, an indication of whether a corresponding region is active can be placed. In a preferred embodiment, when a bit in an active entry 160–175 is set, the corresponding region is active. The region bitfield 158 also includes bitfield entries 180–195 for the possible active regions. Each bitfield entry 180–195 in the bitfield 158 indicates the subpixels which the corresponding active region covers.

Figure 5A:
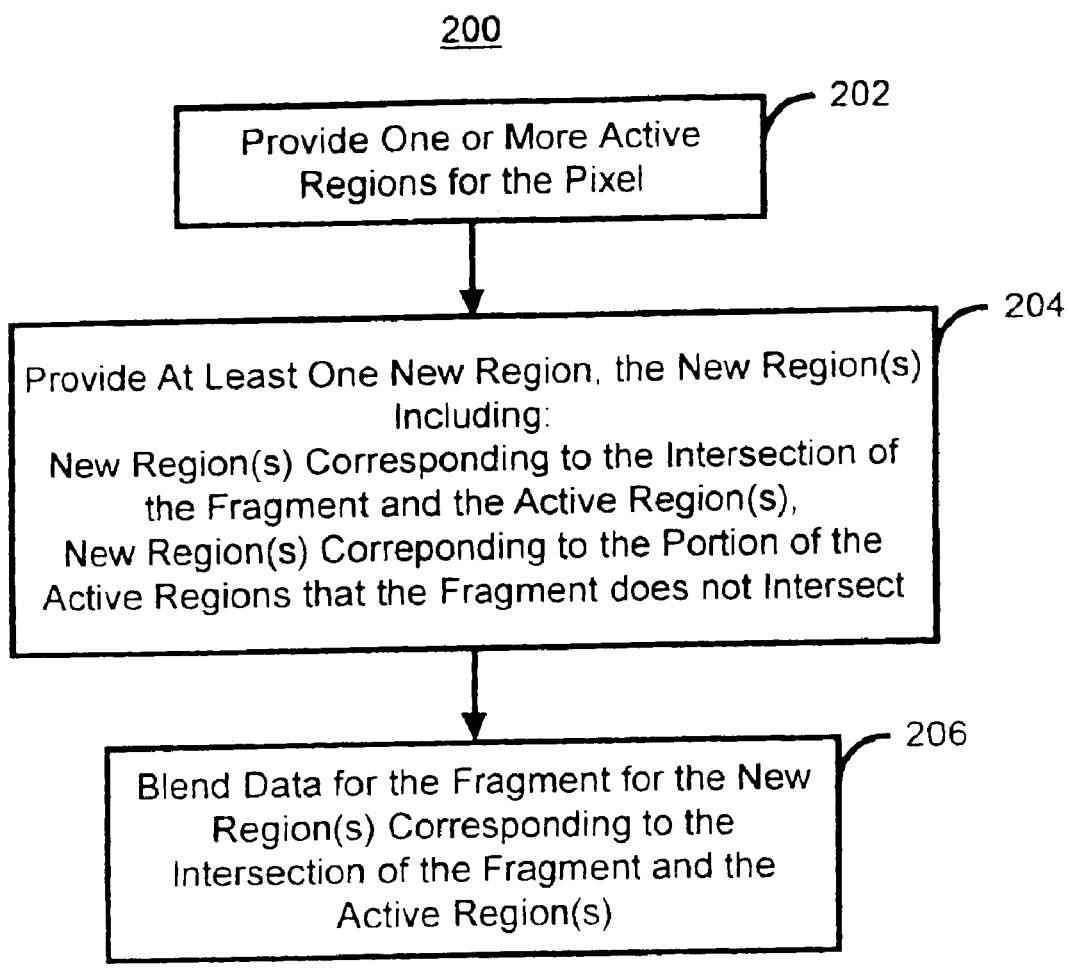
FIG. 5A is a high-level flow chart of a method for blending data for one pixel in accordance with the present invention.

FIG. 5A depicts a high-level flow chart of a method 200 in accordance with the present invention for blending data for a fragment in intersecting a selected pixel of the display 104'. A fragment includes an indication of a portion of the pixel that the fragment intersects. In a preferred embodiment, this indication is provided by a coverage mask. In one embodiment the coverage mask is the same as the area mask, discussed above. However, in another embodiment, the coverage mask could be another mask. For example, where the method 200 is used in implicit edge antialiasing, the coverage mask for the fragment may be the total mask, described above. The method 200 preferably processes the fragments intersecting the selected pixel one at a time. Furthermore, each pixel can be divided into a plurality of subpixels. In a preferred embodiment, each pixel is divided into a four by four array of subpixels.

One or more active region is provided for the pixel, via step 202. The at least one active region intersects at least a portion of the pixel. Thus, the at least one active region intersects some or all of the subpixels in the pixel. In a preferred embodiment, a first active region covering the entire pixel is provided in step 202. Preferably, the first active region is provided by setting the bit in a first active entry 160. Also in a preferred embodiment, the first bitfield entry 180 indicates that the entire pixel is covered. However, in an alternate embodiment, the first active region may not be the entire pixel. For example, where each blending unit is used for a portion of each pixel, the first active region may cover only a portion of the pixel.

At least one new region is provided by determining the intersection between each of the active region(s) and the fragment, via step 204. In a preferred embodiment, step 204 includes determining the intersection between each of the active region(s) and coverage mask of the fragment using the intersection mask generator 152. The number of new regions provided in step 204 depends on the number of active regions and what portion of each active region that the fragment intersects. The new regions are also divided into a first portion of the new region(s) and a second portion of the new regions. The first portion of the new regions could include one or more new regions. The first portion includes new region(s) corresponding to the portions of the active regions that the fragment intersects. Thus, the first portion of the new regions indicate the portions of the active regions in which data in the accumulator, including color, will change due to the fragment. The second portion of the new regions could include zero or more new regions. The second portion includes new region(s) corresponding to the portions of the active region(s) that the fragment does not intersect.

The first portion of the new region(s) are then are then blended using the blending unit 144', via step 206. For each new region in the first portion of the new regions, the blending unit preferably utilizes one clock cycle. The results are also stored in the accumulator 142' in step 206. In a preferred embodiment, step 206 includes blending the color for the new fragment with any color stored in the accumulator 142' for each subpixel in the first portion of the new regions.

Figure 5B:
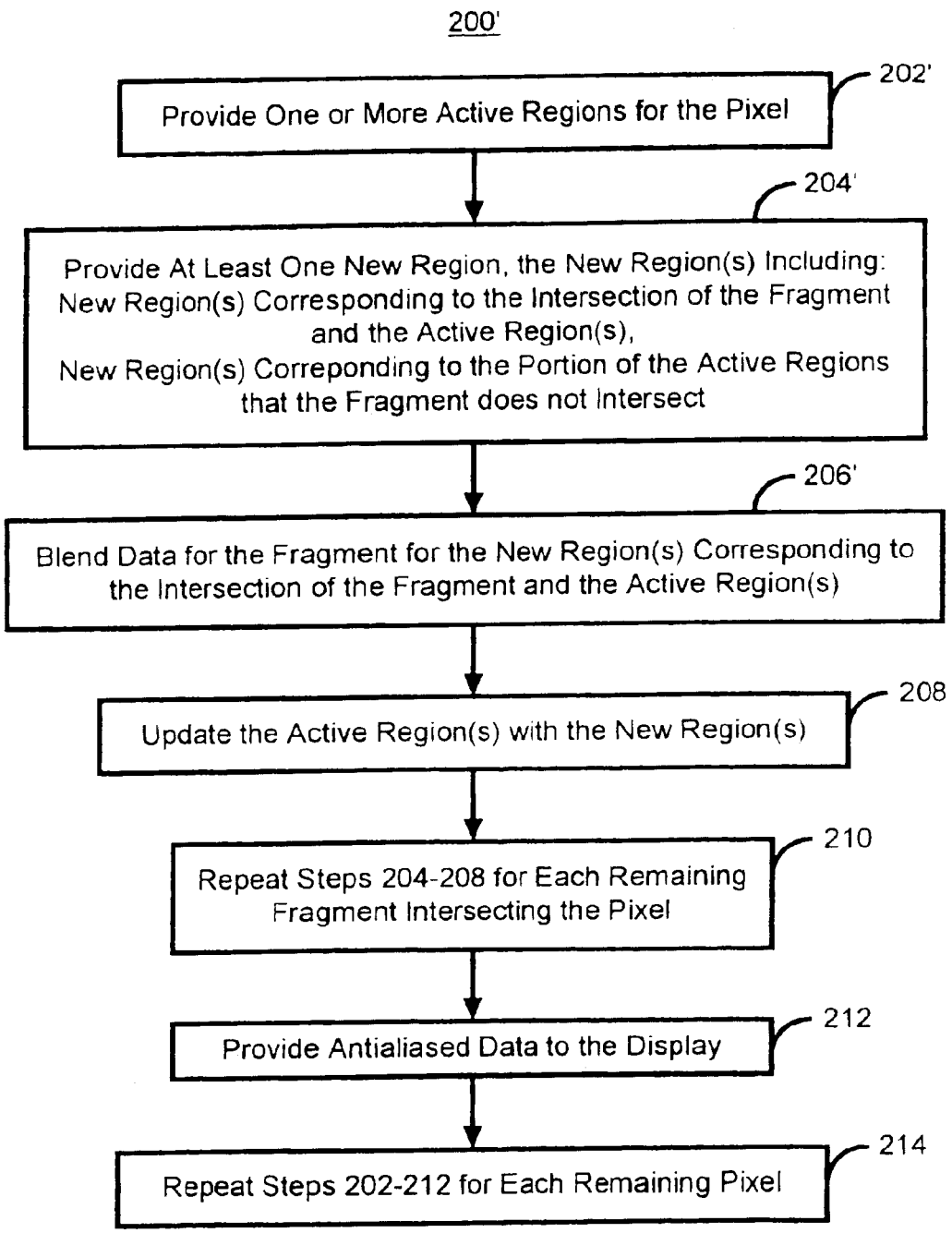
FIG. 5B is a high-level flow chart of a method for antialiasing data for a graphical display in accordance with the present invention.

FIG. 5B depicts a high-level flow chart of a method 200' in accordance with the present invention for providing antialiased data for the graphical display being shown on the display 104'. Steps 202' through 206' are analogous to step 202 through 206 of the method 200. Referring back to FIG. 5B, the active region(s) are updated with the new region(s), via step 208. Thus, the active regions include the first portion of the new regions, where the previous active regions and the fragment intersected, and the second portion of the new regions, where the previous active regions and the fragment did not intersect. Steps 204 through 208 are then repeated for each remaining fragment that intersects the pixel, via step 210. Thus, the intersection between the active regions and each new fragment is determined. New regions are then provided based on the intersections. The color and other data for fragments are blended, and the active regions updated. The process continues repeating until all of the fragments intersecting the pixel have been blended.

Once data for all of the fragments intersecting the pixel have been blended, the antialiased data for the pixel is provided, via step 212. In a preferred embodiment, step 212 includes providing the data currently stored for each subpixel in accumulator 142' to the display 104'. Steps 204 through 212 are then repeated for each pixel remaining in the display, via step 214. Thus, antialiasing can be performed for each of the objects shown on the display 104'.

Figure 6:
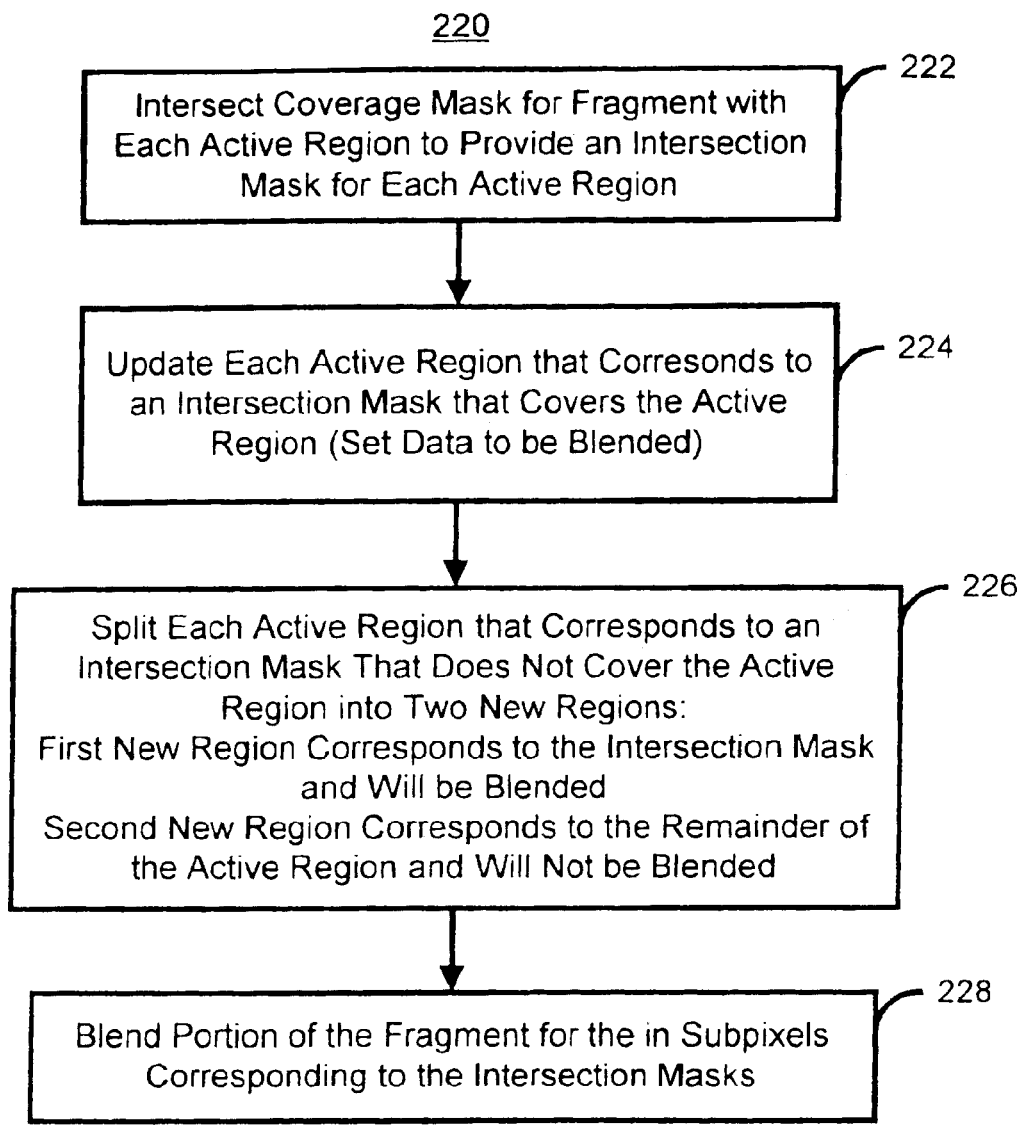
FIG. 6 is a flow chart of a method for providing and blending regions in accordance with the present invention.

FIG. 6 depicts a more detailed flow chart of a method 220 for performing the step 204 and 206 of generating the at least one new region and blending the fragment. The coverage mask for the fragment is intersected with each of the active region(s) to provide an intersection mask for each of the active region(s), via step 222. In a preferred embodiment, step 222 includes performing a logical AND of the bitfield of each of the active region(s) with the coverage mask of the fragment. The active regions that the fragment intersects can be divided into two groups. The first group includes the active regions that are completely covered by the coverage mask of the fragment. The second group includes the active regions that are not completely covered by the coverage mask of the fragment. For each of the active regions which are covered by the coverage mask of the fragment, the active region is updated as being a new region, via step 224. The active region is updated because the color or other data stored for the fragment will be changed by the data of the fragment. In a preferred embodiment, step 224 includes indicating the active region is to be blended, but does not change the active entry 160–175 or the bitfield entry 180–185 of the active region. Each active region that is not covered by the coverage mask is split into two new regions, via step 226. The first new region includes the portion of the active region that intersects the fragment. The first new region will be blended because the color and other data for the first new region will be changed by the data of the fragment. The portions of the fragment corresponding to the intersection mask(s) are then blended using the blending unit 144', via step 228. For each blend based on the intersection mask(s), the blending unit 144" preferably utilizes one clock cycle.

Figure 7A:
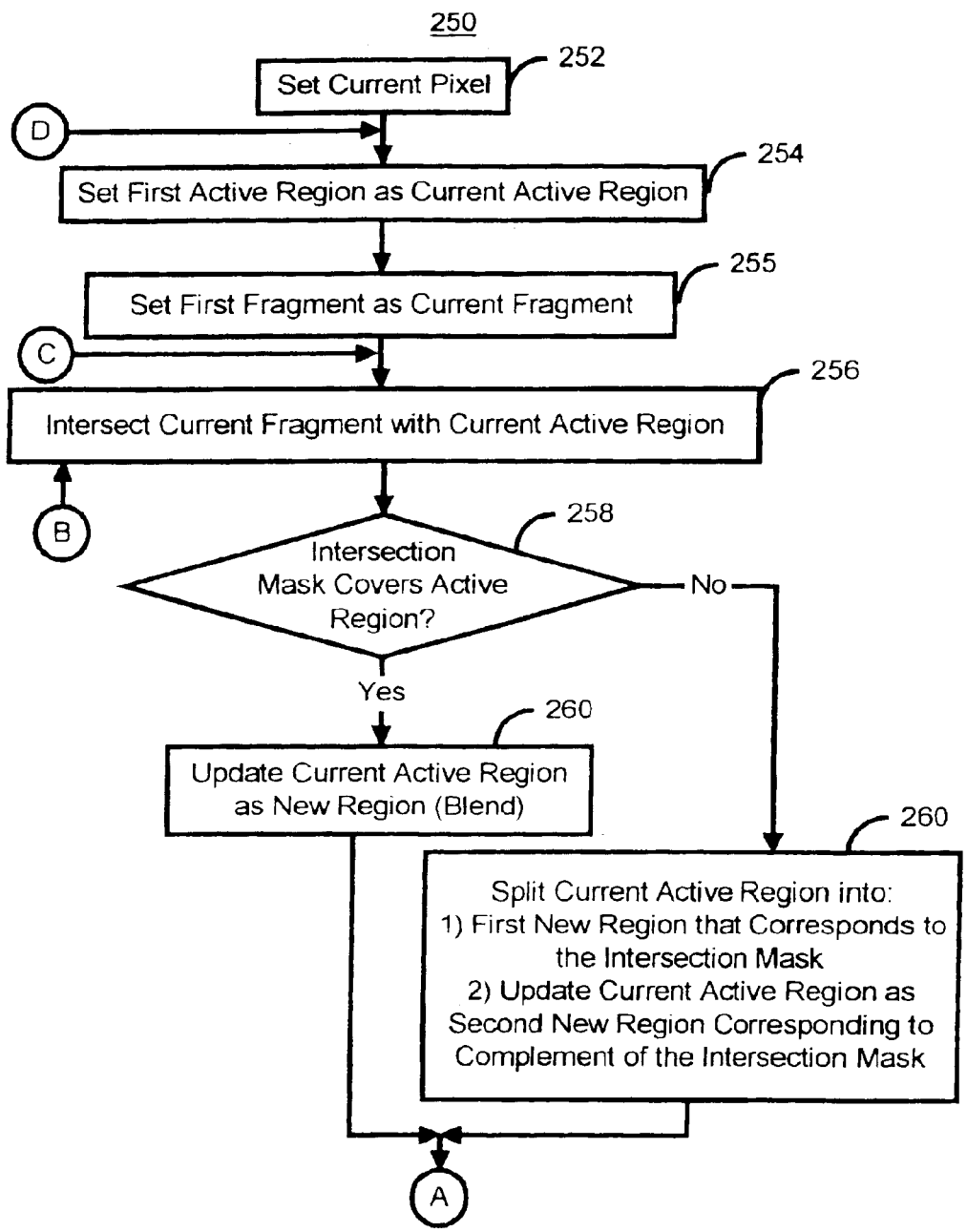
FIGS. 7A and 7B depict a more detailed flow chart of a method for antialiasing data in accordance with the present invention.
Figure 7B:
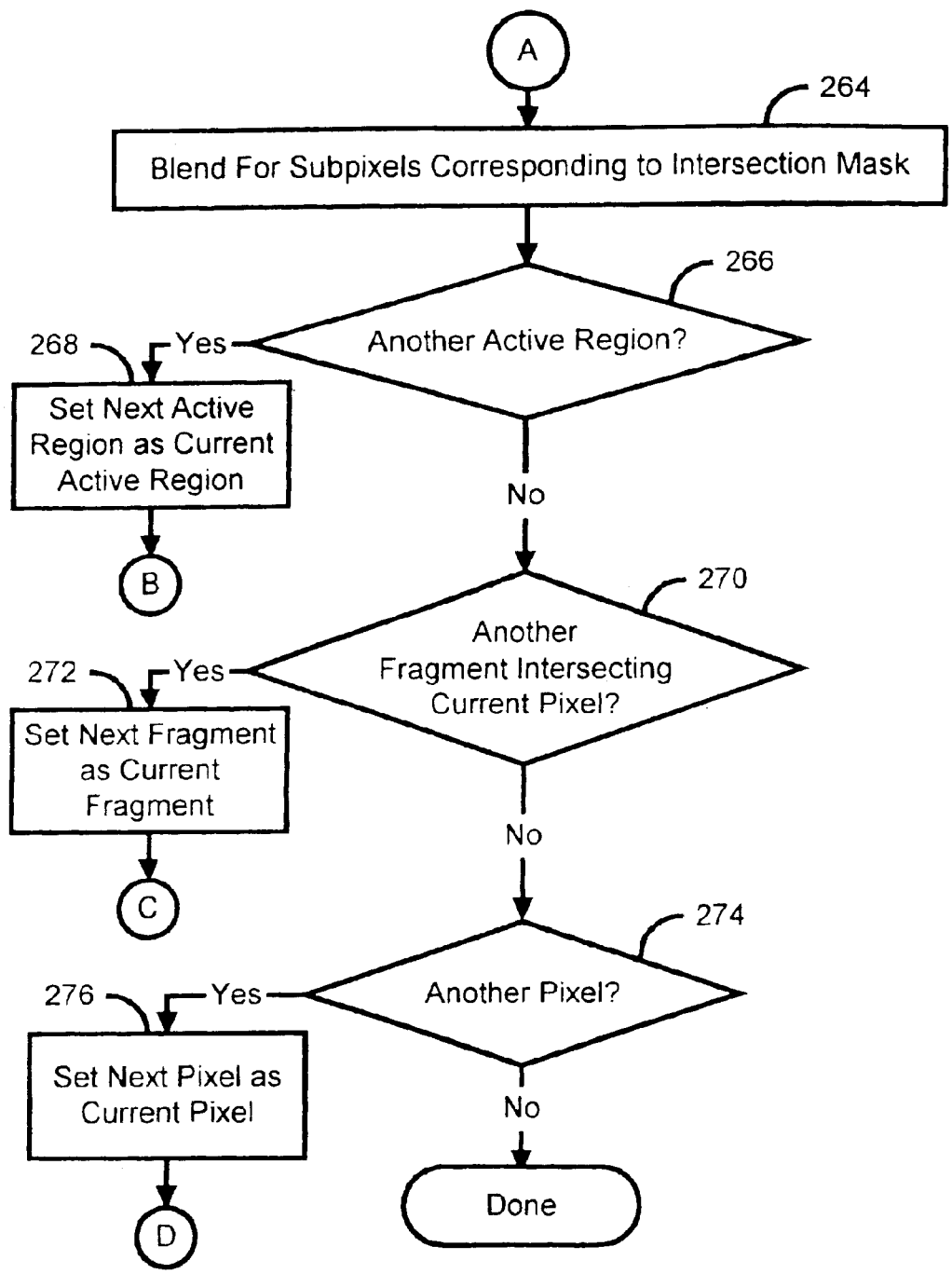

FIGS. 7A and 7B depict a more detailed flow chart of a method 250 for providing antialiased data in accordance with the present invention. The current pixel is selected, via step 252. The first active region is then selected as the current active region, via step 254. The first active region preferably corresponds to the background. Thus, step 254 includes setting the first active entry 160 in the active region list 156 and indicating in the first bitfield entry 180 that the first active region encompasses all subpixels 301–316. Thus step 254 also preferably includes storing the color and other data for the background in the accumulator 142'. Step 254 also includes providing data relating to the first active region from the region list 156 to the intersection mask generator 158.

A first fragment is set as the current fragment, via step 255. The first fragment will be the fragment for the polygon 372. The current fragment is then intersected with the first active region, via step 256. In a preferred embodiment, step 256 includes performing a logical AND of the coverage mask of the fragment and the bitfield 160 of the first active region. Step 256 also includes providing an intersection mask based on the intersection of the coverage mask for the current fragment and the bitfield 160 of the first active region. It is then determined if the coverage mask for the current pixel covers the current active region, via step 258. In such a case, the intersection mask, the coverage mask, and the current active region cover the same portion of the pixel. The coverage mask will cover the first active region if the polygon corresponding to the fragment covers the entire pixel. If the current active region is covered by the coverage mask, then the current active region is updated, via step 262. In a preferred embodiment, step 262 includes indicating that the current active region will undergo a blend without changing the active entry 160–175 or the bitfield entry 180–195 corresponding to the current active region. Thus, no new active regions will be generated if the coverage mask indicates that the fragment intersects the entire current active region.

If, however, coverage mask of the current pixel does not cover the current active region, then the current active region is split into two new regions, via step 260. The first new region formed in step 260 is the same as the intersection mask and includes the portion of the current active region which the fragment intersects. In a preferred embodiment, formation of the first new region in step 260 includes setting a bit in a next active entry of the active entries 160–175 and indicating a next bitfield entry of the next bitfield entries 180–195. The next bitfield entry indicates that the bitfield covers the same portion of the pixel as the intersection mask. The second new region includes the portion of the current active region that the fragment does not intersect. Thus, the second new region will not undergo a blend and corresponds to the complement of the intersection mask. The complement of the intersection mask covers the portion of the current active region not included in the intersection mask. Providing the second new region preferably includes updating the current active region. Updating the current active region for the second new region changes bitfield in the bitfield entry 180–195 of the current active region. The bitfield for the current active region is altered to include only the portion of the pixel covered by the complement of the intersection mask.

A blend is then performed for the intersection mask of the current active region, via step 264. Representative data for the current region, such as color, stored in the accumulator 142' is provided via the current data unit 148. The current data unit 148 selects a subpixel in the current region from the accumulator 142' and provides the representative data from this subpixel. The current data unit 148 receives information regarding which of the subpixels in the accumulator 142' to select from the region list 156. The blending unit 144' blends the data, including color, from the fragment with the representative data in step 264. Step 264 also includes providing the blended data to the broadcast unit 147. The broadcast unit 147 is provided with the intersection mask from the region list 156. The broadcast unit 147 broadcasts the blended data to the subpixels in the intersection mask in step 264. Step 264 preferably takes a single clock cycle.

Figure 8A:
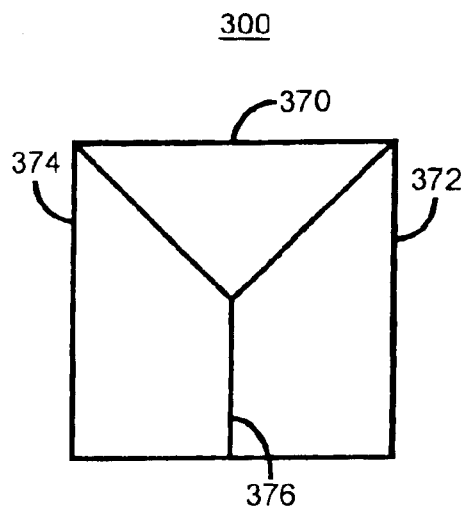
FIG. 8A is a block diagram of one pixel of a graphical display.

It is then determined if another active region remains to be intersected with the current fragment, via step 266. If so, then the next active region is set as the current active region, via step 268. Steps 256 through at least 266 are then repeated. If another active region is not to be intersected with the current fragment, then it is determined in step 270 whether another fragment intersecting the pixel is to be processed, via step 270. If so, then the next fragment to be processed is set as the current fragment, via step 272. Steps 254 through at least 270 are then repeated. If no other fragments intersect the pixel, then it is determined in step 274 whether all pixels in the display 104' have been processed. If not, then the next pixel is set as the current pixel, via step 276. Steps 254 through at least 276 are then repeated. If no pixels remain, then the method 250 terminates. To further explain the method 250, refer to FIGS. 8A through 11D. FIG. 8A depicts a pixel 300 of the display 104'. The pixel 300 includes fragments 372 and 374 for two polygons. Also shown is the background 370. The fragments 372 and 374 share edge 376.

Figure 8B:
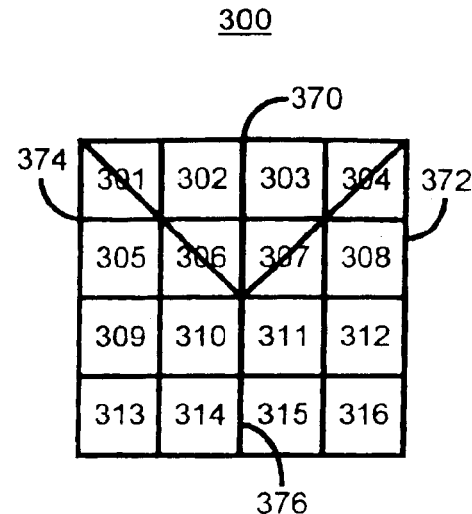
FIG. 8B is a block diagram of one pixel of a graphical display including a plurality of subpixels.
Figure 8C:
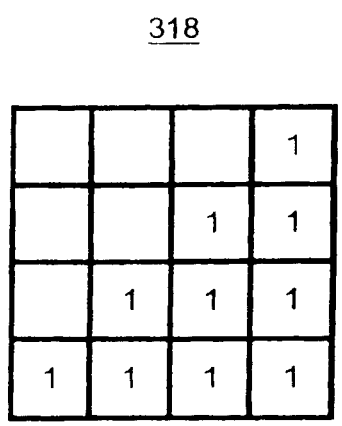
FIG. 8C is the coverage mask for the first fragment intersecting the pixel.
Figure 8D:
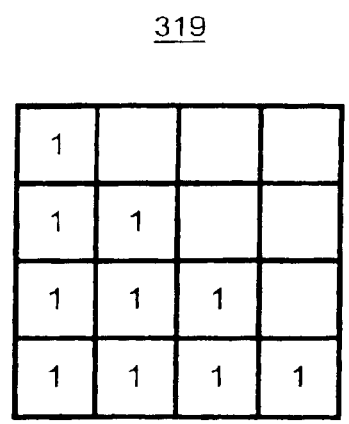
FIG. 8D is the coverage mask for the second fragment intersecting the pixel.

FIG. 8B depicts the same pixel 300, with subpixels 301 through 316 shown. In a preferred embodiment, each pixel 300 is broken into a four by four array of subpixels 301 through 316. However, nothing prevents the use of another number of subpixels. Whether the fragments 372 and 374 intersect at the edge 376 or overlap and occupy the same space at the edge 376 preferably does not substantially change the present invention. However, for ease of explanation, it is presumed that the fragment 372 includes all of subpixels 308, 311–312, and 314–316, as well as half of subpixels 304, 307, 310, and 313. For ease of explanation, it is assumed that the fragment 374 includes all of subpixels 305, 309–310, and 313–315, and half of subpixels 301, 306, 31 1, and 316. FIGS. 8C and 8D depict the coverage masks 318 and 319 for the fragments 372 and 374, respectively.

Figure 9:
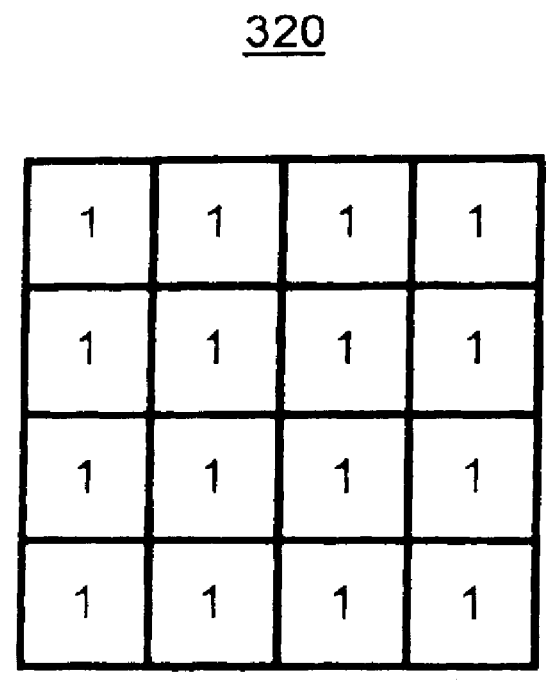

Referring to FIGS. 7–8D, the fragments 372 and 374 are to be rendered. The pixel 300 is set as the current pixel, via step 252. Thus, the bitfield for the first active region is then set as the entire pixel 300. FIG. 9 indicates the first active region 320. Furthermore, data for the first active region is considered to be background data. Consequently, background data is stored for each of the subpixels 301–316. The first fragment is then set as the current fragment, via step 255. For ease of explanation, the first fragment will be the fragment 374.

Figures 10A, 10B, 10C:
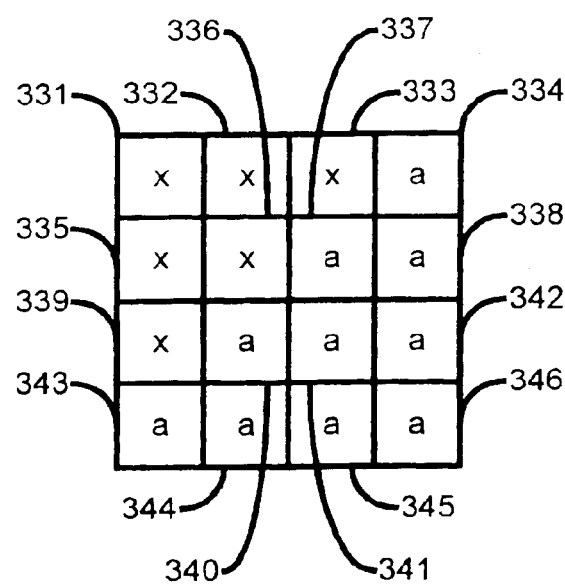
FIG. 10A is a block diagram of the first active region for the pixel after the first fragment is processed.
FIG. 10B is a block diagram of a second active region for the pixel after the first fragment is processed.
FIG. 10C is a block diagram of the accumulator after the first fragment is processed.

The fragment 372 does not cover the entire pixel 300, thus, step 258 will indicate that the coverage mask for the fragment does not cover the first active region 320. Thus, the first active region 320 will be split using step 260. The first new region will be those subpixels corresponding to the intersection mask generated using the first active region 320 and the coverage mask 318 of the fragment 372. The forming the first new region is preferably includes setting the second active entry 161 and indicating in the second bitfield entry 181 that the first new region corresponds to the intersection mask for the fragment 372. Because the first active region 320 covered the entire pixel 300, the intersection mask for the fragment 372 is the same as the coverage mask 318. FIG. 10B depicts the first new region 322. The second new region formed in step 260 will be the remaining portion of the first active region 320. Thus, the second new region is merely an updated version of the first active region. FIG. 10A depicts the first active region 320' after being updated using the complement of the coverage mask. Note that when step 260 is completed, the active regions for the next fragment processed include the first active region 320' and a second active region 322 that is the first new region 322.

A blend is then provided for each intersection mask, via step 264. Step 264 includes blending the data from the fragment 372 with the background data and providing the results to the appropriate portions of the accumulator 142'. FIG. 10C depicts the subpixel buffers 331–345 for the accumulator 142'. The "x" indicates background data. The "a" indicates data for the fragment 372 which has been blended with background data. Thus, subpixel buffers 331–333, 335–336, and 339 include background data. The remaining subpixel buffers 334, 336–338, and 340–346 include blended data.

Figure 11A:
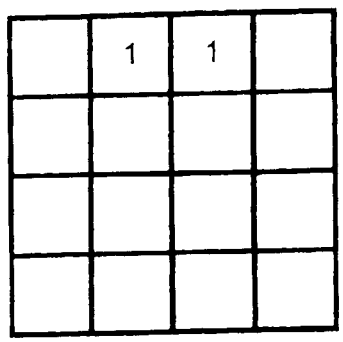
FIG. 11A is a block diagram of the first active region the pixel after the second fragment is processed.
Figure 11B:
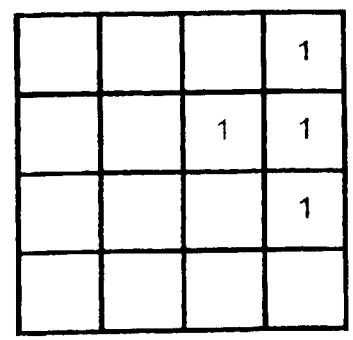
FIG. 11B is a block diagram of the second active region for the pixel after the second fragment is processed.
Figure 11C:
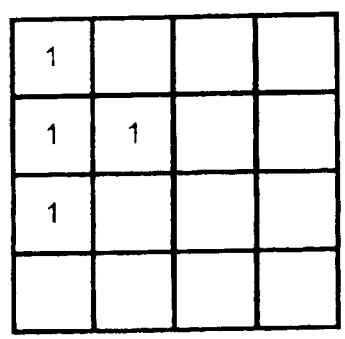
FIG. 11C is a block diagram of the third active region for the pixel after the second fragment is processed.

Because there are no more active regions to be blended and because the fragment 374 is to be processed, the fragment 374 is set as the current fragment in step 272. The first active region 322' is set as the current active region, via step 254. The intersection between the fragment 374 and the first active region 320' is then determined. The fragment 374 does not cover the entire first active region. Therefore, the first active region 320' will be split, via step 260. The first new region will be those subpixels corresponding to the intersection mask generated using the first active region 320' and the coverage mask 319 of the fragment 374. The forming the first new region is preferably includes setting the second third active entry 162 and indicating in the third bitfield entry 182 that the first new region corresponds to the intersection mask for the fragment 374 and the first active region 320'. FIG. 11C depicts the first new region 324, or the third active region 324. The second new region formed in step 260 will be the remaining portion of the first active region 320'. Thus, the second new region is merely an updated version of the first active region 320'. FIG. 11A depicts the first active region 320" after being updated using the complement of the coverage mask.

A blend is then provided for each intersection mask, via step 264. Step 264 includes blending the data from the fragment 374 with the background data and providing the results to the appropriate portions of the accumulator 142'. The blend in step 264 consumes one clock cycle to blend the data in the subpixels corresponding to the third active region 324.

Figure 11D:
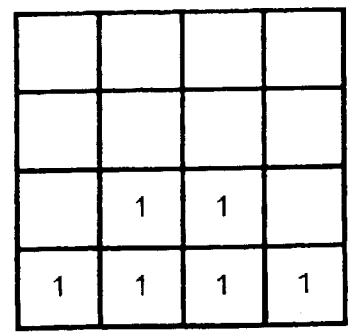
FIG. 11D is a block diagram of the fourth active region for the pixel after the second fragment is processed.

It is then determined that the second active region is to be processed, via step 266. The second active region 322 is set as the current active region, via step 268. The intersection between the fragment 374 and the second active region 322 is then determined. The fragment 374 does not cover the entire second active region. Therefore, the second active region 322 will be split, via step 260. The first new region will be those subpixels corresponding to the intersection mask generated using the second active region 322 and the coverage mask 319 of the fragment 374. The forming the first new region is preferably includes setting the fourth third active entry 163 and indicating in the fourth bitfield entry 183 that the first new region corresponds to the intersection mask for the fragment 374 and the second active region 322. FIG. 11D depicts the first new region 326 formed, or the fourth active region 326. The second new region formed in step 260 will be the remaining portion of the second active region 322. Thus, the second new region is merely an updated version of the second active region 322. FIG. 11B depicts the second active region 322' after being updated using the complement of the coverage mask.

Figure 11E:
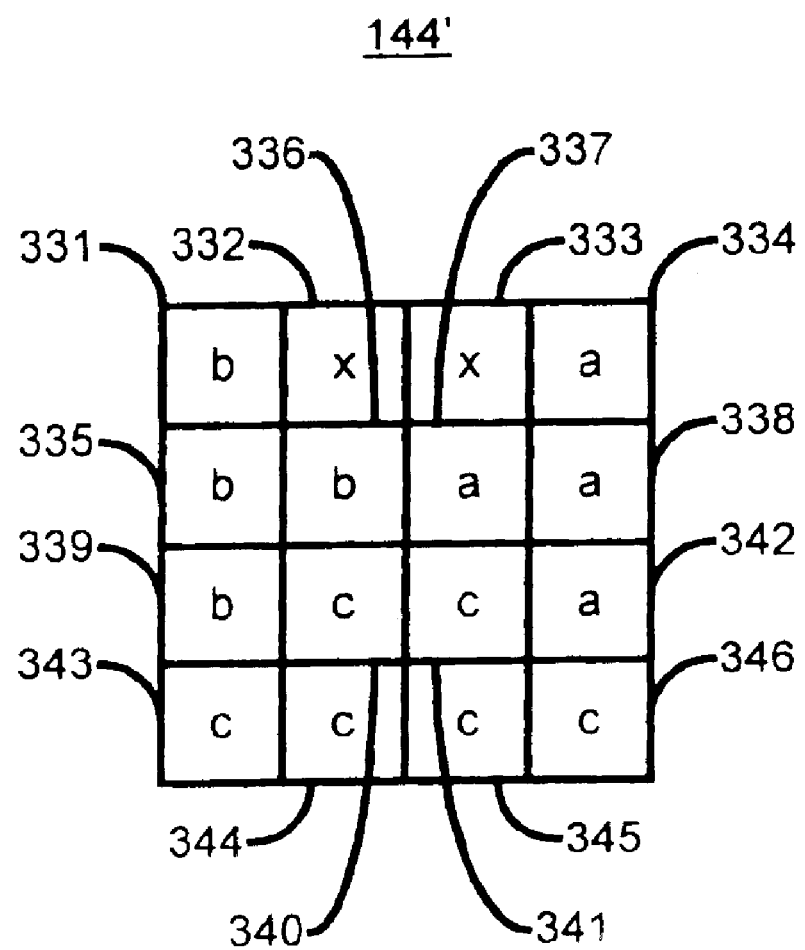
FIG. 11E is a block diagram of data in the accumulator for the pixel after the second fragment is processed.

A blend is then provided for each intersection mask, via step 264. Step 264 includes blending the data from the fragment 374 with the data for the second active region 322 and providing the results to the appropriate portions of the accumulator 142'. The blend in step 264 consumes one clock cycle to blend the data in the subpixels corresponding to the fourth active region 326. FIG. 11E depicts the subpixel buffers 331–345 for the accumulator 142' after the blend. The "x" indicates background data. The "a" indicates data for the fragment 372 which has been blended only with background data. A "b" indicates data for the fragment 374 that has been blended only with background data. A "c" indicates data for the fragment 374 that has been blended with the "a" data. Thus, subpixel buffers 332–333 include background data, subpixel buffers 334, 337–338, and 342 include data for the fragment 372 which has been blended only with background data, subpixel buffers 331, 335–336, and 339 include data for the fragment 374 that has been blended only with background data. Subpixel buffer 340, 341, and 342–346 include data that has been blended for the background, the fragment 372, and the fragment 374.

Using the methods 200, 220, and 250, fewer blending units 142' can be used. In a preferred embodiment, a single blending unit 142' can be used for all subpixels. Thus, a great deal of space is saved in the system 100'. Although blending utilizes a single clock cycle for each blend and, therefore, each intersection mask, this generally does not greatly slow performance. Typically, the number of fragments having an edge in a particular pixel is limited. Thus, the situation shown in FIG. 8A is very unusual. Instead, in the vast majority of cases each fragment occupies an entire pixel. Thus, there is typically one blend performed per fragment. As a result, performance is not slowed. This is because blending units which process a portion of a fragment for a single subpixel buffer also use a clock cycle to provide a blend. Thus, space is saved, generally without sacrificing performance.

In addition, the present invention could be used in conjunction with conventional antialiasing techniques, such as supersampling, adaptive supersampling, the A-buffer technique, and the conventional technique which uses weighting. Use of the present invention in performing supersampling, for example, would allow a single blending unit to be used in supersampling while generally maintaining processing speed. Similarly, the silhouette, discussed above with respect to adaptive supersampling, could be handled similarly to the masks discussed with respect to antialiasing and implicit edge antialiasing. Thus, adaptive supersampling is also consistent with the present invention. Consequently, the method and system in accordance with the present invention can also reduce the number of blending units used in conventional antialiasing techniques, usually without sacrificing performance.

Even in the unusual situation where multiple fragments include edges at a pixel, any degradation in performance is generally graceful. In other words, as more fragments have edges at the same pixel, more active regions will be generated. More intersection masks will also be generated for each fragment. In a preferred embodiment, each intersection mask results in a blend. The more intersection masks, the more blends. Generally, there is one blend for each active region intersected (each intersection mask generated). Thus the system may slow. However, the system should continue to function. Thus, any loss in performance encountered is graceful.

A method and system has been disclosed for efficiently providing antialiasing using fewer blending units. Software written according to the present invention can be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing antialiasing of a graphical image from data describing at least one object, the at least one object including a plurality of fragments, the system comprising:

a display including a plurality of pixels, each of the plurality of pixels including a number of subpixels;

means coupled to the display for providing a plurality of fragments for the at least one object, the plurality of fragments intersecting the plurality of pixels, each of the plurality of fragments including an indication of a portion of a corresponding pixel that is intersected;

an antialiasing unit, coupled with the display, for providing antialiasing of each of the plurality of fragments based on the indication of the extent a corresponding pixel is intersected, the antialiasing unit further including an accumulator for storing data relating to the pixel;

a region generator coupled with the accumulator for indicating at least one active region for the pixel and at least one new region, each of the at least one active region intersecting a portion of the pixel, the at least one new region being based on an intersection between the at least one active region and the fragment, a first portion of the at least one new region indicating where in the pixel the at least one active region and the fragment intersect, a second portion of the at least one new region indicating where in the pixel the at least one active region and the fragment do not intersect, the region generator indicating the first portion of the at least one new region to be blended, the region generator further including the region list for indicating the at least one active region for the pixel;

the intersection generator coupled with the region list determining at least one new region for the at least one active region and providing the region list with the at least one new region; and a blending unit coupled with the accumulator and the region providing, the blending unit blending a portion of the fragment in the first portion of the at least one new region in the fragment.

* * * * *